US012716295B2

(12) United States Patent
Stover et al.

(10) Patent No.: US 12,716,295 B2
(45) Date of Patent: Aug. 25, 2026

(54) MEZZANINE GATE ASSEMBLY

(71) Applicant: DIVERSE HOLDINGS, LLC, Delaware, OH (US)

(72) Inventors: Carl L. Stover, Ostrander, OH (US); Craig T. Jones, Johnstown, OH (US)

( * ) Notice: Subject to any disclaimer, the term of this patent is extended or adjusted under 35 U.S.C. 154(b) by 0 days.

(21) Appl. No.: 18/634,616

(22) Filed: Apr. 12, 2024

(65) Prior Publication Data

US 2024/0271486 A1 Aug. 15, 2024

Related U.S. Application Data

(60) Provisional application No. 63/484,660, filed on Feb. 13, 2023.

(51) Int. Cl.
*E06B 11/02* (2006.01)

(52) U.S. Cl.
CPC .......... *E06B 11/025* (2013.01); *E06B 11/027* (2013.01)

(58) Field of Classification Search
CPC .... E06B 11/025; E06B 11/027; E06B 11/022; E06B 2003/343; E04G 5/141
See application file for complete search history.

(56) References Cited

U.S. PATENT DOCUMENTS 10,519,014 B2 * 12/2019 Conway .................. B66F 11/04
11,965,379 B2 * 4/2024 Angenend ............. E05C 19/003
2013/0219790 A1 * 8/2013 Honeycutt .............. E06B 11/04 49/176
2015/0040481 A1 * 2/2015 Stover ................. E04G 21/3223 49/414
2016/0253894 A1 * 9/2016 Pignolet .................... G08B 5/36 49/13
2017/0152691 A1 * 6/2017 Laurance ............ E05D 11/0054
2019/0078369 A1 * 3/2019 Stover ........................ E06B 9/04
2020/0208361 A1 * 7/2020 Stover ...................... E06B 11/02
2022/0341400 A1 * 10/2022 Park ......................... E04G 5/141
2023/0264925 A1 * 8/2023 Schlabach ............. B66B 13/303

FOREIGN PATENT DOCUMENTS

GB 2 423 327 * 8/2006
KR 10-2010-0101210 * 9/2010
KR 10-2296425 * 9/2021

* cited by examiner

*Primary Examiner* — Gregory J Strimbu
(74) *Attorney, Agent, or Firm* — Bryce D. Miracle; MIP Legal, Ltd.

(57) ABSTRACT

A mezzanine gate assembly for positioning along an edge of an elevated platform having a railing. The mezzanine gate assembly comprises a central support assembly having a first lateral side and an opposing second lateral side. A first side gate assembly is pivotally mounted and supported by the central support assembly at the first lateral side, and a second side gate assembly is pivotally mounted and supported by the central support assembly at the second lateral side. Each of the first and second side gate assemblies comprises a lower swing arm and an upper swing arm, each having a proximal end and a distal end, each proximal end pivotally attached to the central support assembly, and a vertical member pivotally connecting between each of the distal ends of each of the upper swing arm and the lower swing arm.

5 Claims, 10 Drawing Sheets

MEZZANINE GATE ASSEMBLY

CROSS-REFERENCE TO RELATED APPLICATION

This application is based upon and claims the priority filing date of the previously filed, U.S. Provisional patent application entitled "MEZZANINE GATE ASSEMBLY," filed Feb. 13, 2023, having App. No. 63/484,660, the entire disclosure of which is hereby incorporated herein by reference.

FIELD OF THE INVENTION

The present invention relates to the field of safety gates, particularly with regard to a mezzanine gate assembly for safe enclosure and access to an elevated loading and unloading area.

BACKGROUND

Mezzanines or mezzanine floor systems are semi-permanent floor systems frequently used in industrial operations with high ceilings, such as warehousing, distribution, or manufacturing. Mezzanines are typically built between two permanent original stories, generally allowing unused space to be utilized within the vertical space. Railings and/or chains typically provide a safety barrier about the periphery of these areas.

Mezzanines are often built without fall protection, resulting in frequent accidents, including serious injury and even death. Moreover, forklifts and other machinery are used to access, deliver, and receive goods to and from an elevated mezzanine platform. An opening must be present within existing railing and barrier systems to accommodate receiving the goods thereto. Thus, workers are exposed to a discontinuity in the railing and risk falling off the mezzanine structure.

There have been many attempts to solve this problem without any reliable, cost-effective solution. For example, employees have been required to connect themselves to the mezzanine structure by way of a cable or other means of connection, such that if they did fall, the cable would prevent them from falling over the side of the mezzanine onto the floor below. However, this standard protocol requires that the employee painstakingly follow through with connecting and disconnecting throughout each position on the mezzanine-inherently wasting time and resources.

For the foregoing reason, a safety gate that is cost-efficient and easy to operate is needed to sufficiently provide fall protection for workers on a mezzanine structure.

SUMMARY

In accordance with the invention, a mezzanine gate assembly is disclosed, which provides a cost-efficient and reliable gate for preventing falls and injury as well as a gate that can easily be adapted for use in conjunction with a forklift for delivery of goods to and from an elevated platform. The gate configuration provides a safe, low-cost, and time-saving approach to preventing falls while efficiently delivering goods to and from an elevated platform.

The invention generally functions to provide a continuous barrier at a delivery opening and between existing railings throughout the delivery of goods to an elevated platform by way of a forklift. In a version of the application, the mezzanine gate assembly provides a central support assembly that is centrally positioned, defining adjacent first and second side openings. The mezzanine gate assembly generally includes first and second side gate assemblies for providing a barrier within the respective first and second side openings.

In a version, the first and second side gate assemblies are pivotally mounted to the respective lateral side of the central support assembly. Each of the side frames is vertically movable about a first rotational axis, preferably a horizontal axis, between a downward position to an elevated position and movable about a second rotational axis, preferably a vertical axis, from a forward position to an aft position, thereby allowing travel between a forward, closed position to an aft, open position.

In some aspects, the techniques described herein relate to a mezzanine gate assembly for positioning along an edge of an elevated platform having a railing, the mezzanine gate assembly including: a central support assembly having a first lateral side and an opposing second lateral side; a first side gate assembly pivotally mounted and supported by the central support assembly at the first lateral side, the first side gate assembly having a lower swing arm and an upper swing arm, each having a proximal end and a distal end, each proximal end pivotally attached to the central support assembly, and a member pivotally connecting between each of the distal ends of each of the upper swing arm and the lower swing arm; and a second side gate assembly pivotally mounted and supported by the central support assembly at the second lateral side, the second side gate assembly having a lower swing arm and an upper swing arm, each having a proximal end and a distal end, each proximal end pivotally attached to the central support assembly, and a member pivotally connecting between each of the distal ends of each of the upper swing arm and the lower swing arm; wherein the first side gate assembly and the second side gate assembly are each movable between a downward position and an elevated position rotatable about one or more first directional axis and are movable between a forward position and an aft position rotatable about a second directional axis.

In some aspects, the techniques described herein relate to a mezzanine gate assembly, wherein the central support assembly further includes an upright column having a base portion and an upper portion, the upright column providing support to the first and second side gate assemblies throughout their respective paths of motion.

In some aspects, the techniques described herein relate to a mezzanine gate assembly, wherein the central support assembly further includes vertically disposed parallel first and second upright columns having a base portion and an upper portion, the upright column providing support to the first and second side gate assemblies throughout their respective path of motion.

In some aspects, the techniques described herein relate to a mezzanine gate assembly, wherein each of the first side gate assembly and the second side gate assembly includes at least one horizontal hinge and at least one vertical hinge.

In some aspects, the techniques described herein relate to a mezzanine gate assembly, wherein each of the proximal ends of the upper swing arm and the lower swing arm of each of the first side gate assembly and the second side gate assembly are operably connected to the central support by a horizontal hinge and a vertical hinge.

In some aspects, the techniques described herein relate to a mezzanine gate assembly, further including a plurality of multidirectional rollers operably positioned on the upper swing arms and the lower swing arms of the first side gate assembly and the second side gate assembly.

In some aspects, the techniques described herein relate to a mezzanine gate assembly, further including a plurality of multidirectional rollers operably positioned on the vertical member of the first side gate assembly and the vertical member of the second side gate assembly.

Still, other versions, benefits and advantages of the invention will become apparent to those skilled in the art to which it pertains upon a reading and understanding of the following detailed specification.

BRIEF DESCRIPTION OF THE DRAWINGS

These and other features, aspects, and advantages of the present invention will become better understood with regard to the following description and accompanying figures where.

DETAILED DESCRIPTION

In the following description, for purposes of explanation and not limitation, specific details are set forth, such as particular architectures, interfaces, techniques, etc., in order to provide a thorough understanding of the present invention. However, it will be apparent to those skilled in the art that the present invention may be practiced in other versions that depart from these specific details. In other instances, detailed descriptions of well-known devices, circuits, and methods are omitted so as not to obscure the description of the present invention with unnecessary detail.

Moreover, the description is not to be taken in the limiting sense but is made merely to illustrate the general principles of the invention since the scope of the invention is best defined by the appended claims. Various inventive features are described below that can each be used independently of one another or in combination with other features.

Unless otherwise defined, all technical terms used herein have the same meaning as commonly understood by one of ordinary skill in the art to which the invention belongs. As used in the specification and the appended claims, the singular forms "a," "an," and "the" include plural references unless the context clearly dictates otherwise. Any reference to "or" herein is intended to encompass "and/or" unless otherwise stated.

Referring now to the figures wherein the showings are for purposes of illustrating a preferred version of the invention only and not for purposes of limiting the same, the present invention is a mezzanine gate assembly 100 adapted to provide ingress and egress to a mezzanine structure 300 while safely preventing falls and injury to workers 320 positioned thereon or even below the elevated platform 302. Generally, the gate assembly 100 is designed to meet or exceed industry standards in its current form.

Figure 1:
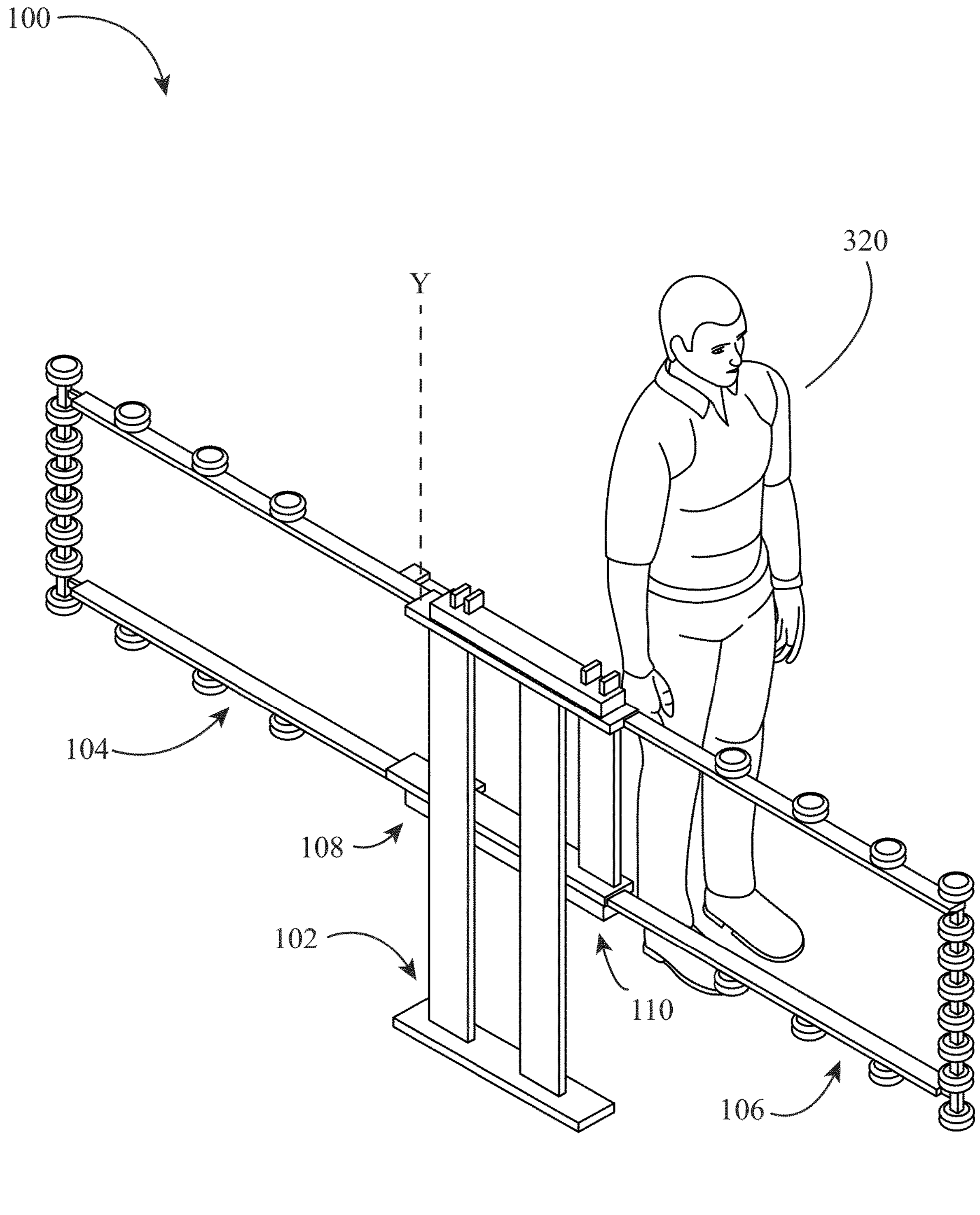
FIG. 1 is a front perspective view showing a version of the mezzanine gate assembly while in the default forward, closed position.
Figure 2:
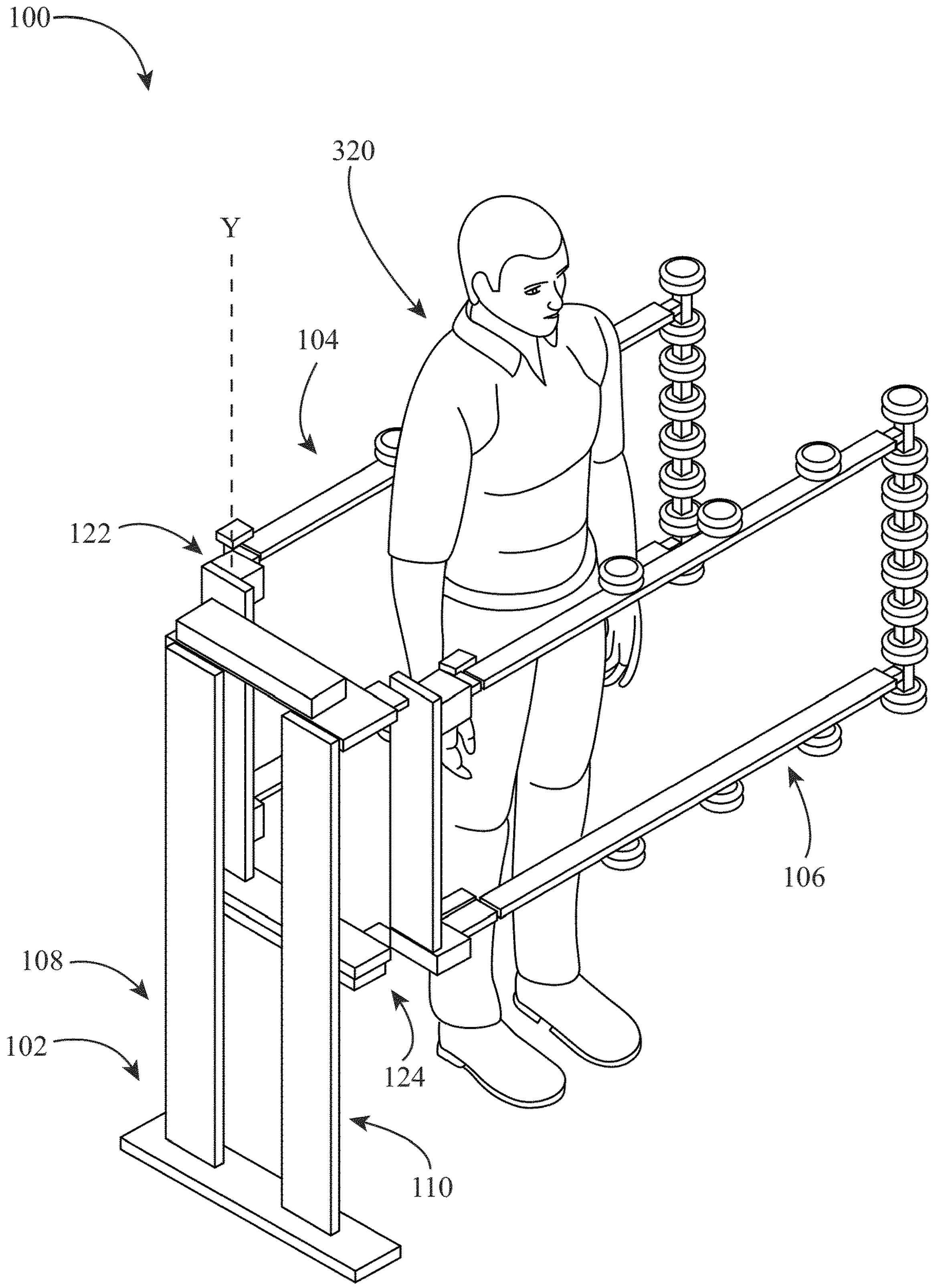
FIG. 2 is a front perspective view of the mezzanine gate assembly shown in FIG. 1 while in the aft, open position.
Figure 3:
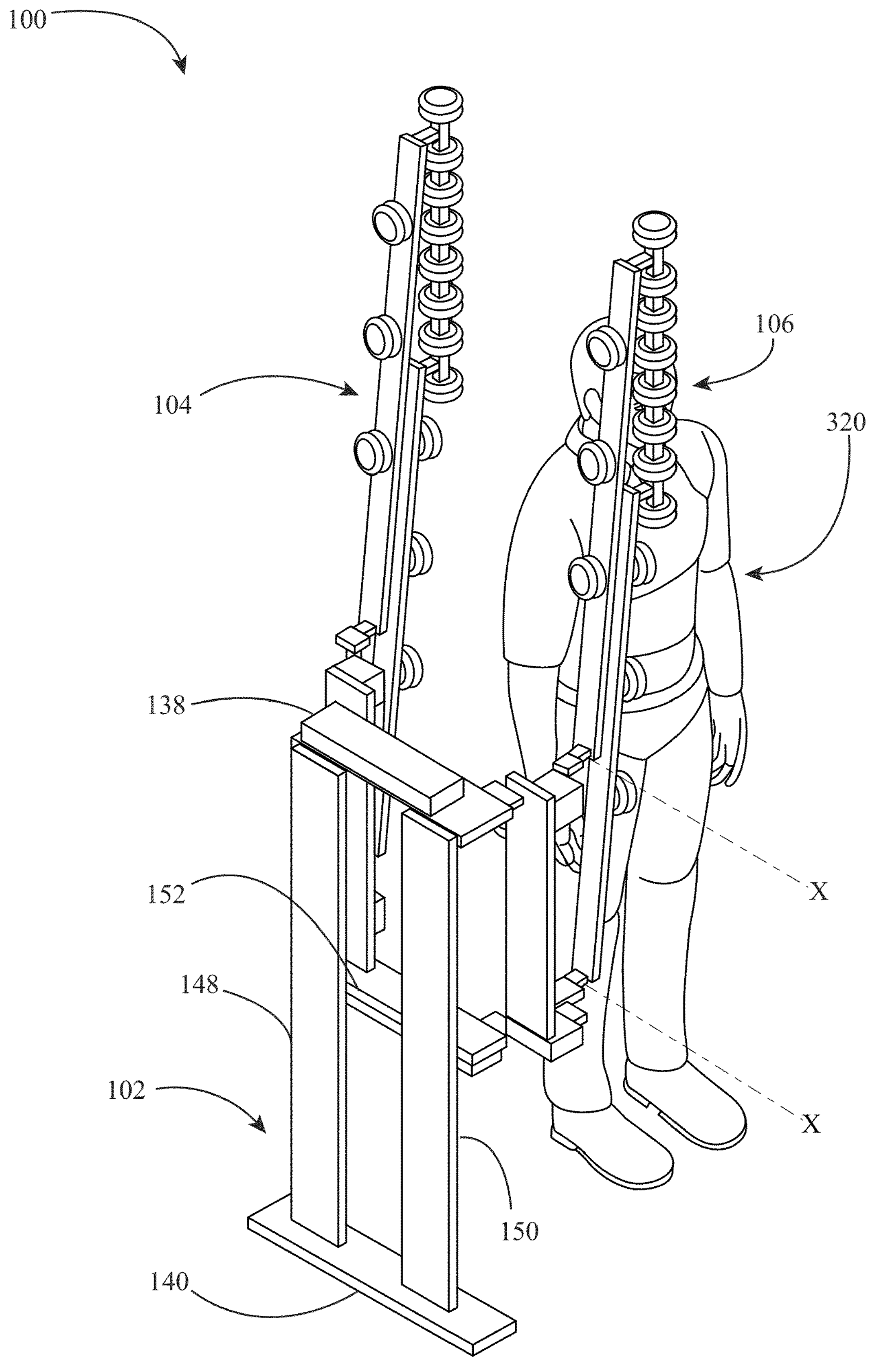
FIG. 3 is a front perspective view of the mezzanine gate assembly shown in FIG. 1 while in the aft, raised position.
Figure 5:
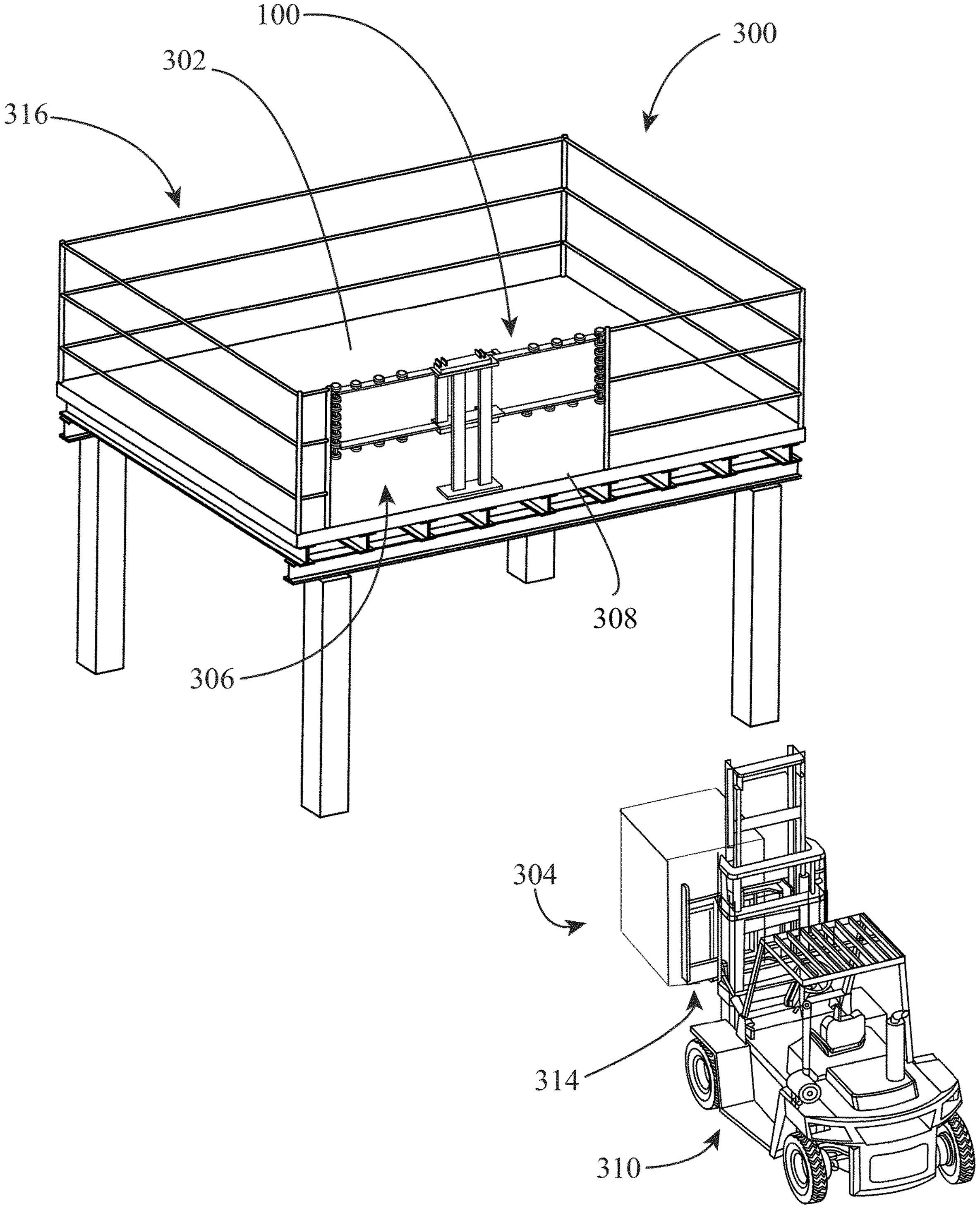
FIG. 5 is an illustrative mezzanine providing an elevated platform, edge, railing, a delivery opening, and a version of the mezzanine gate assembly positioned within the delivery opening.

With reference to FIG. 1 and FIG. 5, a typical mezzanine structure 300 provides an elevated platform 302 for delivering a load 304 of goods through a delivery opening 306 at the edge 308. As illustrated, a railing 316 or chain is used to line the periphery of the mezzanine structure 300 to provide stability and prevent falls. The delivery opening 306 is formed within a discontinuous portion of the railing 316 and mezzanine structure 300.

As best illustrated by FIG. 5, a version of the mezzanine gate assembly 100 is operably positioned along the edge 308 of the elevated platform 302 at the delivery opening 306 to provide continuity with the perimeter railing 316. As shown, a forklift 310 is utilized to move the load 304 of goods on a pallet via forks to the elevated platform 302 through the delivery opening 306.

Referring to FIG. 1-FIG. 9, a version of the mezzanine gate assembly 100 generally comprises a central support assembly 102, a first side gate assembly 104, and a second side gate assembly 106, each positioned at opposing first and second lateral sides 108, 110 of the central support assembly 102.

The central support assembly 102 is fixedly attached to the edge 308 of the delivery opening 306 and supports the first side gate assembly 104 and the second side gate assemblies 106 throughout the operation thereof.

Generally, each of the first and second side gate assemblies 104, 106 are mirrored and designed to move and pivot independently through a path of motion, which provides a plurality of points of travel. Each of the first and second side gate assemblies 104, 106 is operably designed to engage and pivot rearward while a load 304 is delivered to the elevated platform 302 via forklift 310 via a vertical axis and then retreats back up and over the load 304 to the default forward, closed position placing the load 304 safely behind the mezzanine gate assembly 100 while the load 304 is removed from a respective pallet.

Figure 6:
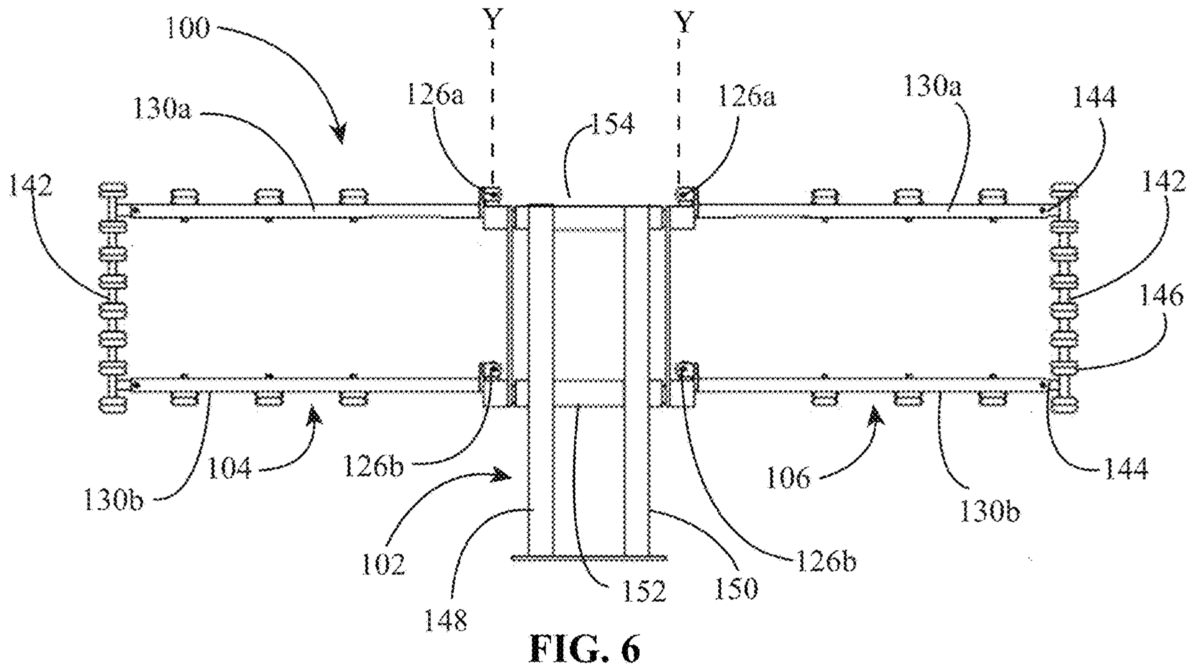
FIG. 6 is a front elevation view of a version of the mezzanine gate assembly shown while in a default forward, closed position.
Figure 7:
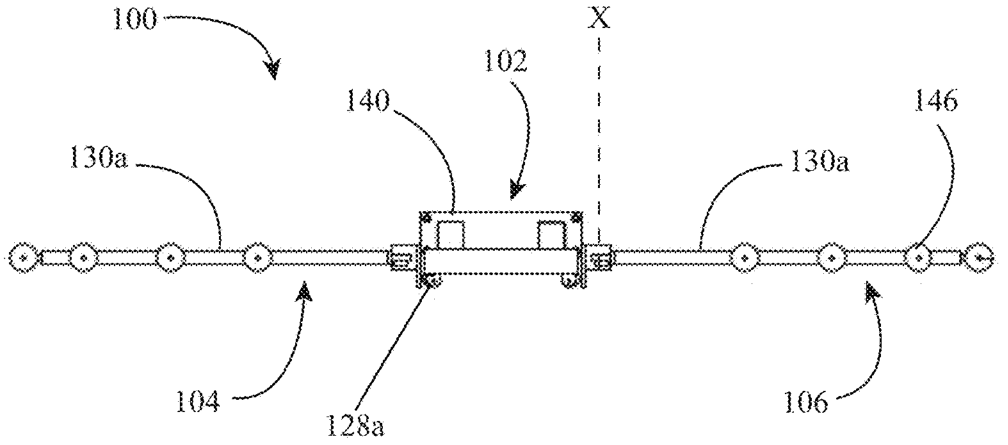
FIG. 7 is a top plan view of the mezzanine gate assembly shown in FIG. 6 while in the default forward, closed position.
Figure 8:
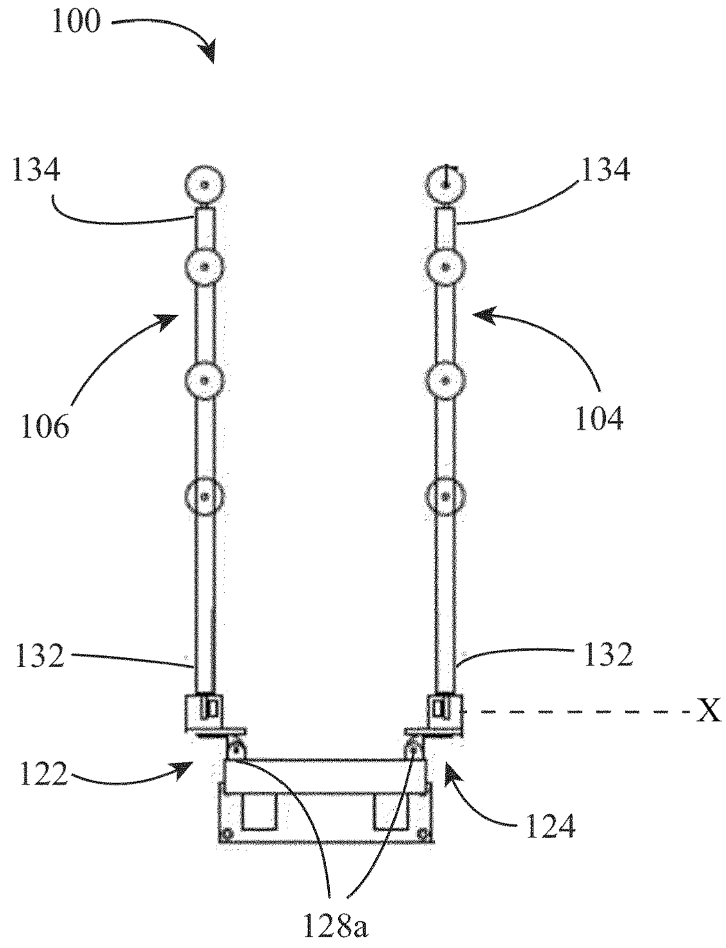
FIG. 8 is a top plan view of the mezzanine gate assembly of the version shown in FIG. 6 while in the aft, open position.
Figure 9:
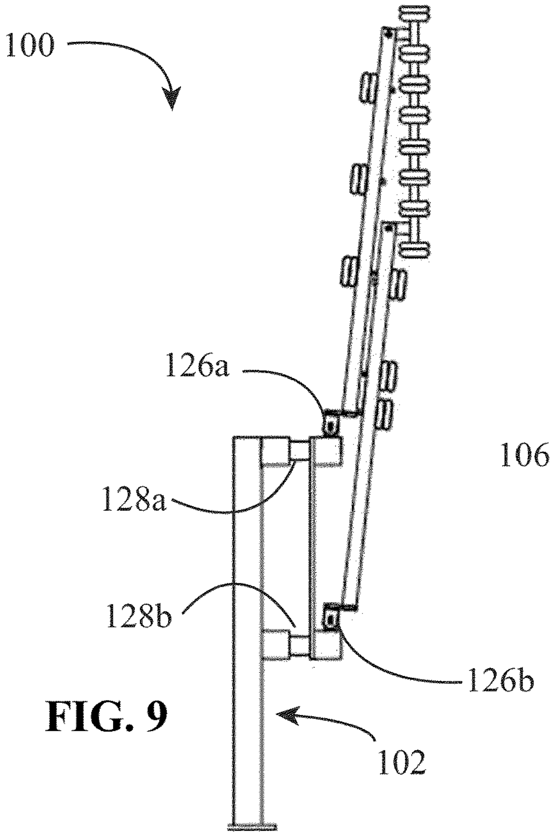
FIG. 9 is a side elevation view of the mezzanine gate assembly of the version shown in FIG. 6 while in the aft, raised position.
Figure 10:
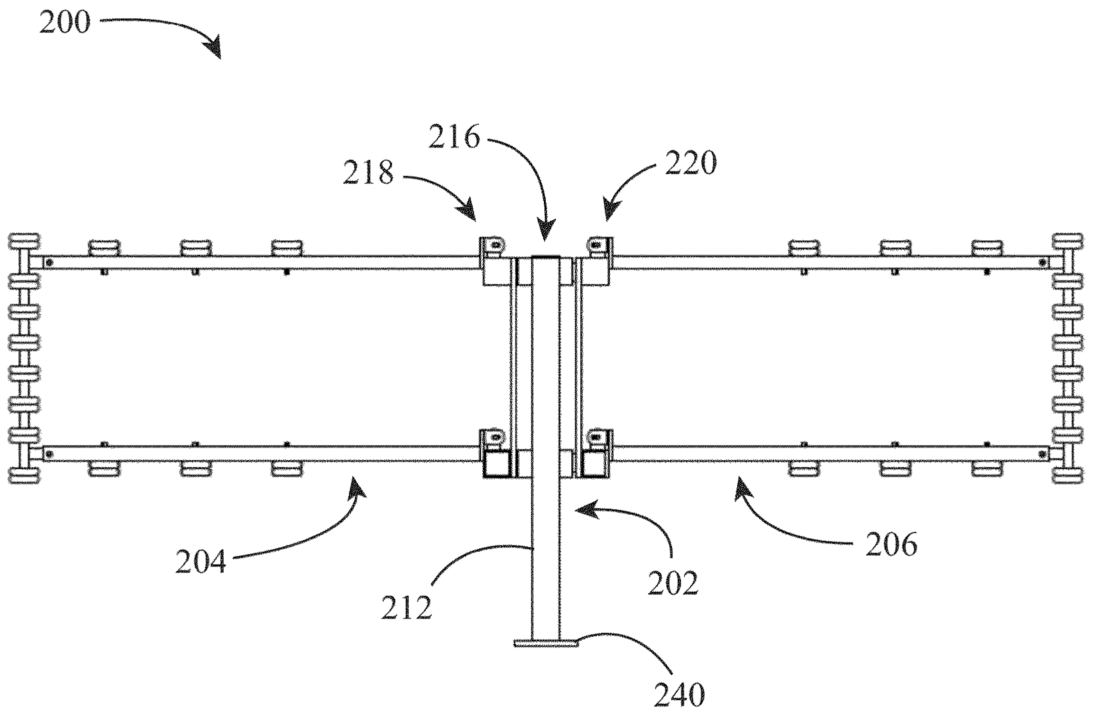
FIG. 10 is a front elevation view of a second version of a mezzanine gate assembly shown while in a default forward, closed position.
Figure 11:
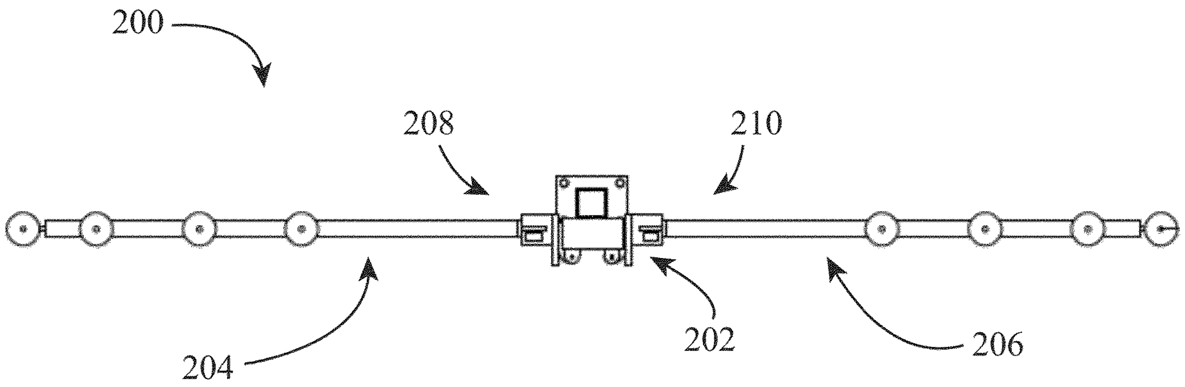
FIG. 11 is a top plan view of the mezzanine gate assembly shown in FIG. 10 while in the default forward, closed position.
Figure 12:
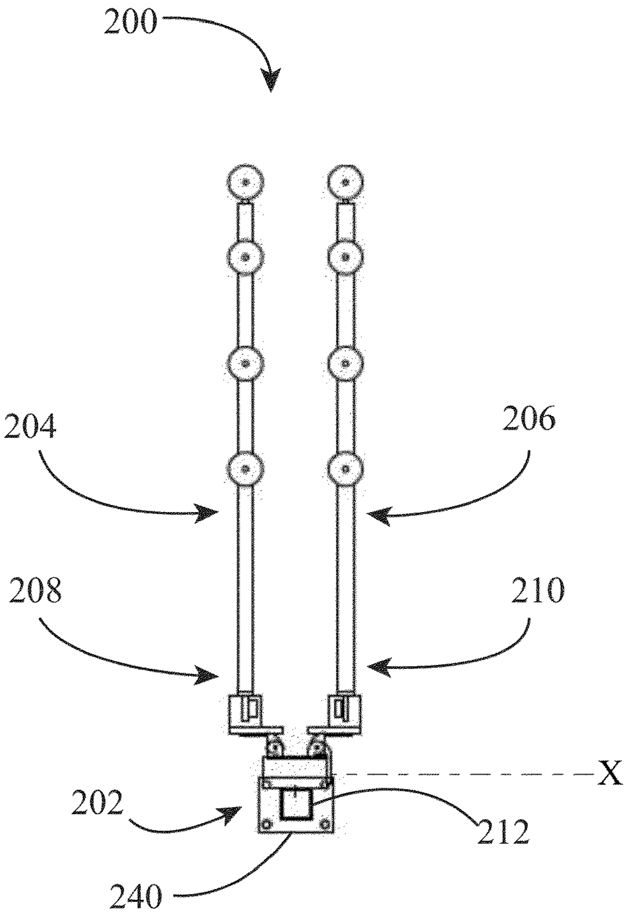
FIG. 12 is a top plan view of the mezzanine gate assembly shown in FIG. 10 while in the aft, open position.
Figure 13:
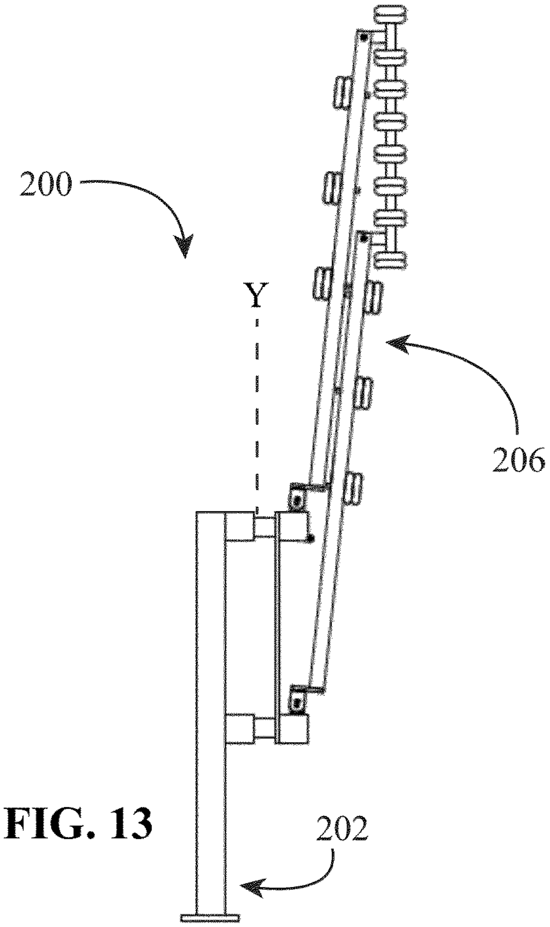
FIG. 13 is a side elevation view of the mezzanine gate assembly shown in FIG. 10 while in the aft, raised position.

As best shown in FIG. 6, the central support assembly 102 further comprises first and second upright columns 148, 150 that are vertically disposed in parallel. The configuration provides a greater width and lateral stability between the pivotally mounted first and second side gate assemblies 104, 106 and provides additional space for a worker 320 to stand and remain safe during operation (See FIG. 2). In the version, the central support assembly 102 includes a base portion 140 attachable to the elevated platform 302, a horizontal mid-point member 152 and a horizontal top member 154. The horizontal mid-point member 152 and the horizontal top member 154 connect the parallel first and second upright columns 148, 150, providing an overall rigid central support assembly 102 construction.

Figure 4:
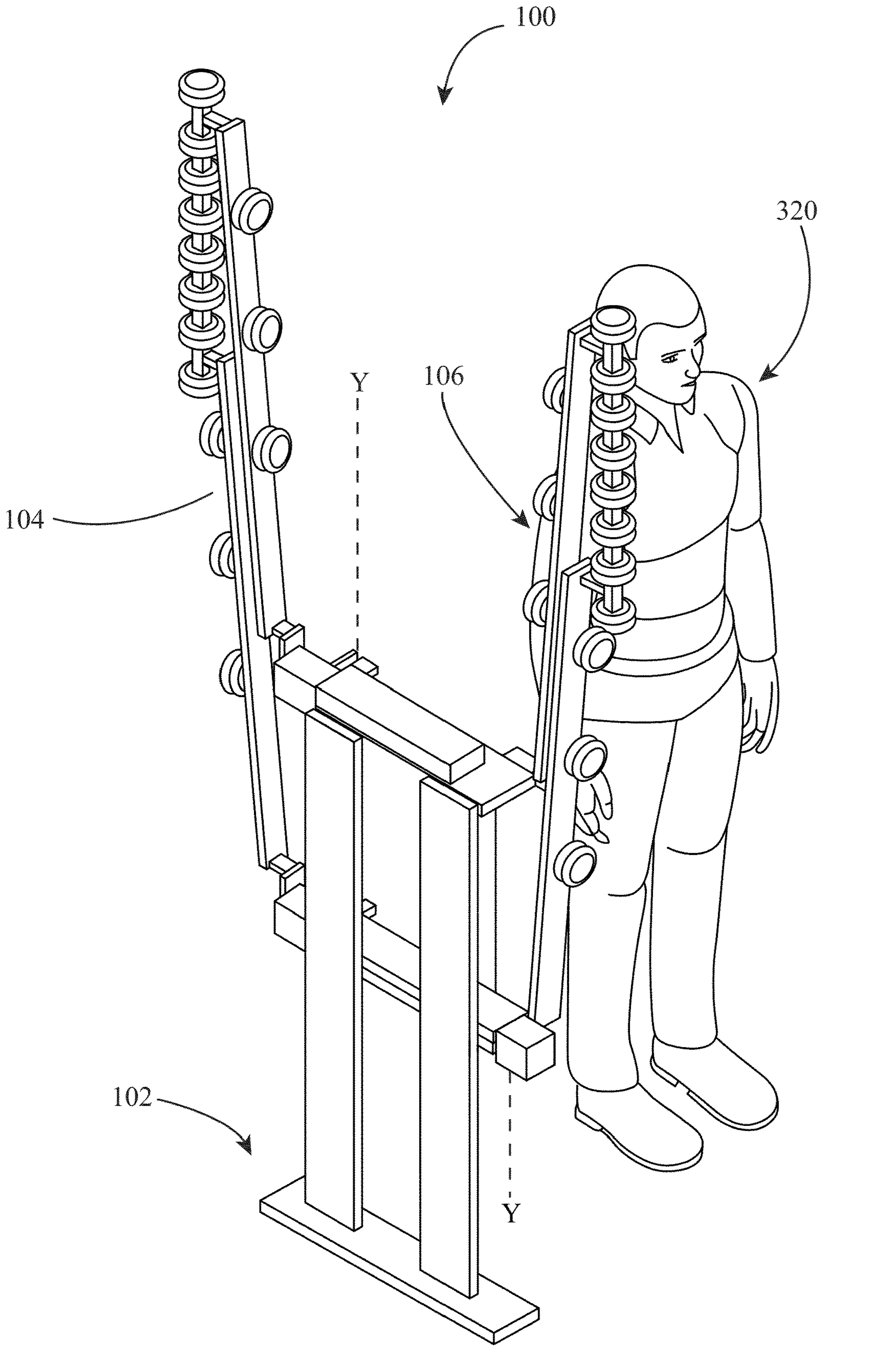
FIG. 4 is a front perspective view of the mezzanine gate assembly shown in FIG. 1 while in the forward, raised position.

Specifically, each of the first and second side gate assemblies 104, 106 are pivotal between a plurality of points of travel throughout a respective path of motion provided a first and second side hinge assemblies 122, 124, each providing a combination of horizontal X and vertical axis Y rotations. In the illustrated version, each of the first and second side gate assemblies 104, 106 operably move through a combination of distinct positions that comprise a default forward, closed position (FIG. 1 and FIG. 6), an aft, open position (FIG. 2 and FIG. 8), an elevated, aft position (FIG. 3 and FIG. 9), and a forward, elevated position (FIG. 4). Generally, the movement through these points allow the delivery of a load 304 to the platform 302 while providing a continuous barrier along the delivery opening 306.

In further detail, the first and second side hinge assemblies 122, 124 each comprise a plurality of horizontal hinges 126*a*, 126*b* that provide a horizontal axis of rotation X and a plurality of vertical hinges 128*a*, 128*b* that provide a vertical axis of rotation Y. The horizontal hinges 126*a*, 126*b* allow each of the first and second side gate assemblies 104, 106 to independently move upward and downward about the horizontal axis of rotation X, thereby providing an opening at the first and second lateral sides 108, 110 (see FIG. 3). Similarly, the vertical hinges 128*a*, 128*b* allow each of the first and second side gate assemblies 104, 106 to operably move rearward and forward about the vertical axis of rotation Y. The combination of rotational axis X, Y provided by the horizontal hinges 126*a*, 126*b* and vertical hinges 128*a*, 128*b* allows each of the first and second side gate assemblies 104, 106 to move between the default forward, closed position (FIG. 1 and FIG. 6) and the aft, open position (FIG. 2 and FIG. 8) in both a non-linear manner and a linear manner, for example, the path of movement may follow an arc to lift over or avoid a pallet of goods while moving from the aft, open position to the default forward, closed position.

In a version of the application, with reference to FIG. 5-FIG. 9, as illustrated, each of the first and second side gate assemblies 104, 106 generally comprises parallel lower and upper swing arms 130*a*, 130*b*, each having a proximal end 132 and a distal end 134. The proximal end 132 of each swing arm 130*a*, 130*b* is operably and pivotally attached to the requisite first and second side hinge assemblies 122, 124 that are operably connected between the central support assembly 102 and the first and second side gate assemblies 104, 106. The upper swing arm 130*a* proximal end 132 is connected towards the upper portion 138 of the central support assembly 102 and the lower swing arm 130*b* proximal end 132 is connected midway between the base portion 140 and the upper portion 138 of the central support assembly 102.

As best illustrated in FIG. 6, a vertical member 142 pivotally connects the distal ends 134 of each requisite upper and lower swing arms 130*a*, 130*b*. The vertical member 142, via hinged contacts 144 positioned at each distal end 134, provides structural supports between the upper and lower swing arms 130*a*, 130*b*, remaining substantially vertical throughout the path of motion (See FIG. 9).

Figure 15:
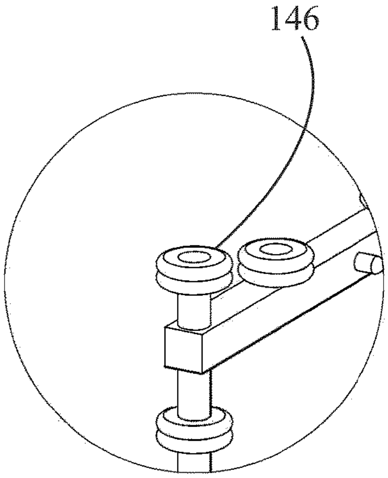
FIG. 15 is an up-close view of a plurality of rollers utilized in a version of the mezzanine gate assembly.

In certain versions, each of the first and second side gate assemblies 104, 106 swing arms 130*a*, 130*b* support a plurality of multidirectional rollers 146, which operably provide rotation in multiple directions. As best illustrated in FIG. 15, the plurality of multidirectional rollers 146 assists with receiving the vertical and horizontal movement of the load 304 onto elevated platform 302. Therefore, allowing the load 304 to roll smoothly through the respective first and second side gate assemblies 104, 106, thereby mitigating damage thereto.

With reference to the version shown in FIG. 10-FIG. 13, a second version of the mezzanine gate assembly 200 is shown. In this version, the central support assembly 202 includes a singular upright column 212 having a base portion 240 operably fixedly attached to the elevated platform 302 and an upper portion 216, which is configured to function as a post central between the delivery opening 306. The upright column 212 divides the mezzanine gate assembly 200 between the first lateral side 208 and the second lateral side 210. Further, the central support assembly 202 comprises a first side hinge assembly 218 and a second side hinge assembly 220 for supporting each of the respective first and second side gate assemblies 204, 206 throughout their respective paths of motion within the first and second lateral sides 208, 210.

In certain versions, the first and second side gate assemblies 104, 106, may be spring loaded in that they provide springs or other counterforce to bias movement back towards the default forward, closed position throughout operation.

Figure 14:
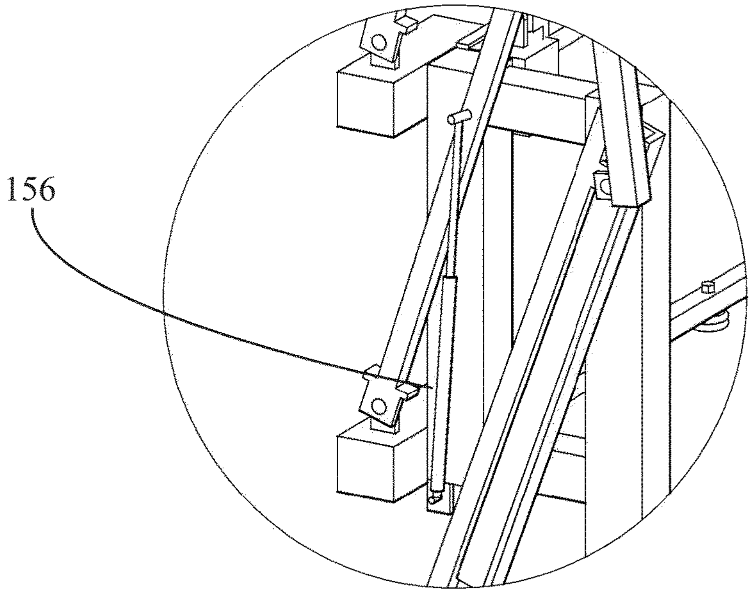
FIG. 14 is an up-close view of an example compression strut or spring utilized in a version of the mezzanine gate assembly.

Referring to FIG. 14, each of the first and second side gate assemblies 104, 106 may further utilize a compression gas spring 156 for providing a smooth, slow transition between the plurality of positions.

The horizontal and vertical hinges 126, 128 of the first and second side hinge assemblies 218, 220 may be one or more hydraulic self-closing hinges that provide a smooth, slow transition between the plurality of positions.

The operation of the mezzanine gate assembly 100 will now be described in detail. Referring to FIG. 1-FIG. 5, initially, the mezzanine gate assembly 100 is positioned in the default forward, closed position, ready to receive a load 304 from the forklift 310 (See FIG. 1 and FIG. 5).

Thereafter, the load 304 is delivered by the forklift 310 to the elevated platform 302 by pushing open at least one of the first and second side gate assemblies 104, 106 rearward about their respective vertical axis Y to the aft, open position. The plurality of multidirectional rollers 146 provides a smooth transition thereof. Then, forklift 310 is released from the pallet 314, leaving the load 304 on the elevated platform 302. The load 304 simultaneously biases the respective first and second side gate assemblies 104, 106 in the aft, open position, thereby providing a barrier between the worker 320 and the load 304 (See FIG. 2).

Thereafter, referring to FIG. 1-FIG. 4, one or both of the first and second side gate assemblies 104, 106 are transitioned from the aft, open position (FIG. 2) to the aft, raised position (FIG. 3) about the horizontal axis X of rotation provided by the horizontal hinges 126. Next, one or both of the first and second side gate assemblies 104, 106 are rotated from the aft, raised position (FIG. 3) to the forward, raised position (FIG. 4) about the Y axis of rotation provided by the vertical hinges 128. Finally, one or both of the first and second side gate assemblies 104, 106 are moved from the forward, raised position (FIG. 4) to the default forward, closed position (FIG. 1) to secure the elevated platform 302 edge 308. The load 304 is then removed from the pallet.

Essentially, the first and second side gate assemblies 104, 106 are moved rearward to accommodate a load 304 onto the elevated platform 302 moved upward, forward, and then downward back into the default forward, closed position in front of the load 304. At this point, the delivery opening 306 is completely secured by the mezzanine gate assembly 100, providing a continuous barrier between the respective railing 316 structure, workers 320, and the load 304. After the load 304 is removed, the forklift 310 can remove the pallet 314 by passing it under the mezzanine gate assembly 100 while in the default forward, closed position without moving the mezzanine gate assembly 100.

The invention does not require that all the advantageous features and advantages be incorporated into every version of the invention.

Although preferred embodiments of the invention have been described in considerable detail, other versions and embodiments of the invention are certainly possible. Therefore, the present invention should not be limited to the described embodiments herein.

All features disclosed in this specification, including any claims, abstract, and drawings, may be replaced by alternative features serving the same, equivalent, or similar purpose unless expressly stated otherwise.

We claim:

1. A mezzanine gate assembly for positioning along an edge of an elevated platform having a railing and a delivery opening, the mezzanine gate assembly comprising:

a central support assembly that is centrally positioned within the delivery opening and, defining opposing adjacent first and second side openings within the delivery opening;

first and second side hinge assemblies, each comprising a plurality of horizontal hinges providing at least one horizontal axis of rotation and a plurality of vertical hinges providing a vertical axis of rotation;

a first side gate assembly pivotally mounted to and supported by the central support assembly such that the first side gate assembly provides a barrier at the first side opening, the first side gate assembly having a lower swing arm and an upper swing arm, each having a proximal end and a distal end, each proximal end of the upper swing arm and the lower swing arm pivotally attached to the central support assembly through both a horizontal hinge of the plurality of horizontal hinges of the first side hinge assembly and a vertical hinge of the plurality of vertical hinges of the first side hinge assembly, and a vertical member pivotally connecting the distal ends of the upper swing arm and the lower swing arm, the vertical member remaining substantially vertical throughout a generally vertical path of motion of the first side gate assembly; and a second side gate assembly pivotally mounted to and supported by the central support assembly such that the second side gate assembly provides a barrier at the second side opening, the second side gate assembly having a lower swing arm and an upper swing arm, each having a proximal end and a distal end, each proximal end of the upper swing arm and the lower swing arm of the second side gate assembly pivotally attached to the central support assembly through both a horizontal hinge of the plurality of horizontal hinges of the second side hinge assembly and a vertical hinge of the plurality of vertical hinges of the second side hinge assembly, and a vertical member pivotally connecting the distal ends of the upper swing arm of the second side gate assembly and the lower swing arm of the second side gate assembly, the vertical member of the second side gate assembly remaining substantially vertical throughout a generally vertical path of motion of the second side gate assembly;

wherein the first side gate assembly and the second side gate assembly each independently rotates between a downward position and an elevated position about a respective one of the horizontal axes of rotation and each independently rotates between a forward position and an aft position about a respective one of the vertical axes of rotation.

2. The mezzanine gate assembly of claim 1, wherein the central support assembly further comprises an upright column having a base portion and an upper portion, the upright column providing support to the first and second side gate assemblies as the first and second side gate assemblies rotate.

3. The mezzanine gate assembly of claim 1, wherein the central support assembly further comprises a base portion, an upper portion and vertically disposed parallel first and second upright columns, the first and second upright columns providing support to the first and second side gate assemblies as the first and second side gate assemblies rotate.

4. The mezzanine gate assembly of claim 1, further comprising a plurality of multidirectional rollers operably positioned on the upper swing arms and the lower swing arms of the first side gate assembly and the second side gate assembly.

5. The mezzanine gate assembly of claim 4, further comprising a plurality of multidirectional rollers operably positioned on the vertical member of the first side gate assembly and the vertical member of the second side gate assembly.

* * * * *